(12) United States Patent
Garwood

(10) Patent No.: US 11,974,527 B2
(45) Date of Patent: May 7, 2024

(54) AUTOMATED FACILITY FOR INTENSIVE LARGE SCALE PRODUCTION OF GRASS FED CATTLE WITH REDUCED OR ELIMINATED CARBON FOOTPRINT

(71) Applicant: Julie Garwood, Vancouver, WA (US)

(72) Inventor: Anthony J. M. Garwood, Mercer Island, WA (US)

( * ) Notice: Subject to any disclaimer, the term of this patent is extended or adjusted under 35 U.S.C. 154(b) by 347 days.

(21) Appl. No.: 16/955,381

(22) PCT Filed: Dec. 18, 2018

(86) PCT No.: PCT/US2018/066166
§ 371 (c)(1),
(2) Date: Jun. 18, 2020

(87) PCT Pub. No.: WO2019/126126
PCT Pub. Date: Jun. 27, 2019

(65) Prior Publication Data
US 2021/0092917 A1   Apr. 1, 2021

Related U.S. Application Data

(60) Provisional application No. 62/607,160, filed on Dec. 18, 2017.

(51) Int. Cl.
*A01G 25/09*    (2006.01)
*A01G 25/16*    (2006.01)
*B60L 15/20*    (2006.01)

(52) U.S. Cl.
CPC ......... *A01G 25/092* (2013.01); *A01G 25/162* (2013.01); *B60L 15/20* (2013.01); *B60L 2200/40* (2013.01); *B60L 2240/12* (2013.01)

(58) Field of Classification Search
CPC ..... A01G 25/092; A01G 25/162; B60L 15/20; B60L 2200/40; B60L 2240/12; Y02P 90/60; Y02T 10/72
See application file for complete search history.

(56) References Cited

U.S. PATENT DOCUMENTS

| | | | |
|---|---|---|---|
| 2009/0084615 A1 | 4/2009 | Parod et al. | |
| 2012/0228864 A1* | 9/2012 | Kerns | A01G 25/092 285/80 |

(Continued)

FOREIGN PATENT DOCUMENTS

| | | | | |
|---|---|---|---|---|
| CA | 2721466 A1 * | 10/2011 | ............. | B65H 57/10 |
| CN | 103039321 A * | 4/2013 | | |

(Continued)

OTHER PUBLICATIONS

O'Shaughnessy et al.; Using an integrated crop water stress index for irrigation scheduling of two corn hybrids in a semi-arid region; Irrigation Science 35.5 (2017); Aug. 1, 2017; pp. 451-467 (Year: 2017).*

(Continued)

*Primary Examiner* — Michael J Zanelli
(74) *Attorney, Agent, or Firm* — Christensen O'Connor Johnson Kindness PLLC

(57) ABSTRACT

An irrigation and harvesting system includes one or more center pivot irrigation assemblies. The center pivot irrigation assembly includes a hollow shaft attached to an area of land; one end of a hollow member is attached to the hollow shaft, wherein the hollow member pivots around the hollow shaft, and wherein the hollow member carries irrigation water; a second end of the hollow member is connected to a wheel in contact with the ground, and the wheel is driven at a controlled speed; and a traction device including harvesting equipment is attached to the hollow member.

5 Claims, 4 Drawing Sheets

(56) References Cited

U.S. PATENT DOCUMENTS

2013/0041537 A1    2/2013    Malsam et al.
2016/0000008 A1    1/2016    Schøler et al.

FOREIGN PATENT DOCUMENTS

| CN | 103597685 A | * | 2/2014 | ............ E02F 9/2016 |
| FR | 3008846 A1 | * | 1/2015 | ........... A01G 25/092 |
| SU | 1711713 A1 | * | 2/1992 | |

OTHER PUBLICATIONS

Byers et al.; Robotic Precision Agriculture Using Gantries; ip.com Prior Art Database Technical Disclosure; ip.com No. IPCOM000244731D; Jan. 6, 2016; pp. 1-13 (Year: 2016).*
International Search Report dated May 14, 2019, issued in corresponding International Application No. PCTUS2018/066166, filed Dec. 18, 2018, 11 pages.

\* cited by examiner

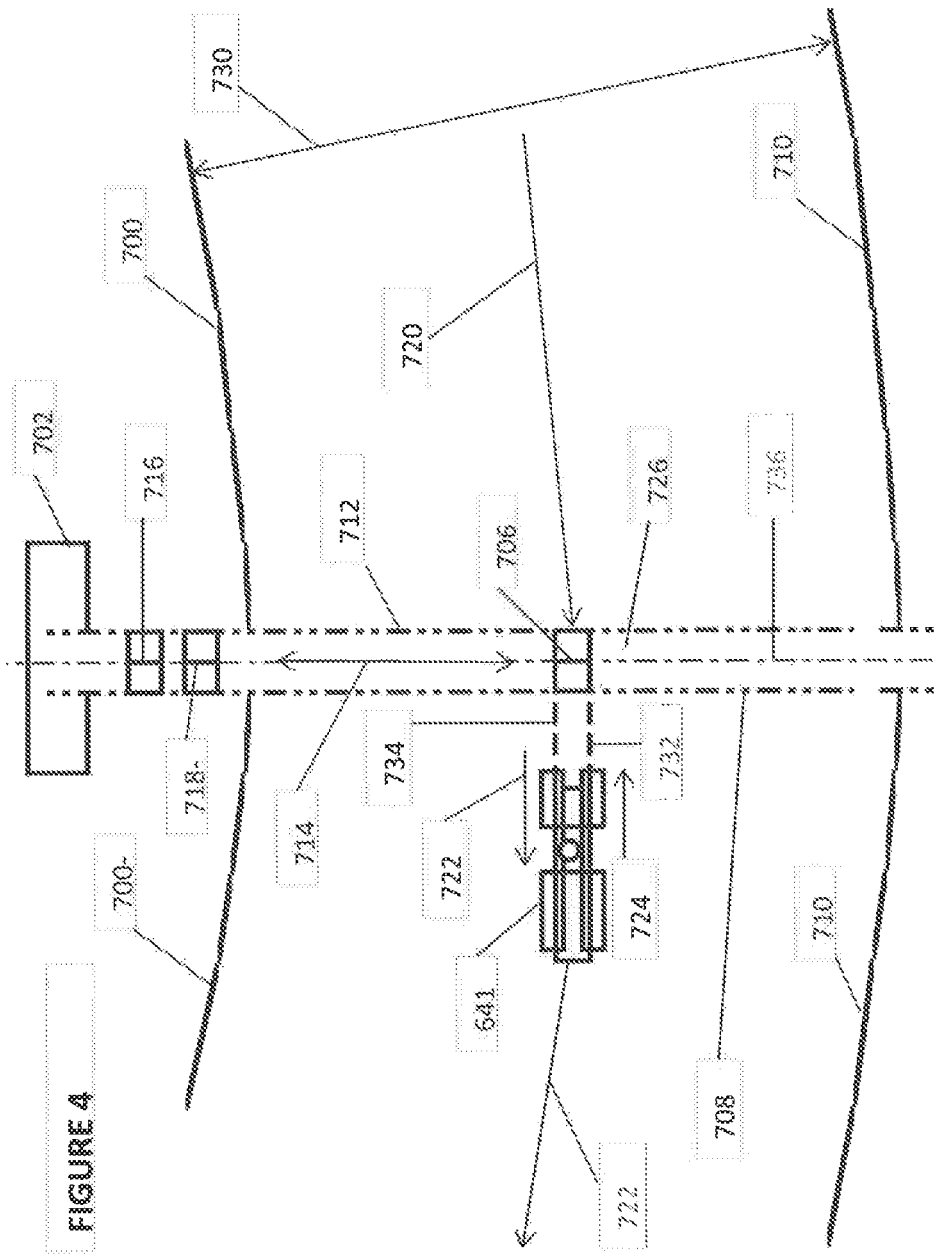

AUTOMATED FACILITY FOR INTENSIVE LARGE SCALE PRODUCTION OF GRASS FED CATTLE WITH REDUCED OR ELIMINATED CARBON FOOTPRINT

CROSS-REFERENCE TO RELATED APPLICATION

This application claims the benefit of Provisional Application No. 62/607,160, filed Dec. 18, 2017, the entire contents of which are incorporated herein by reference.

BACKGROUND

The human population of the world during 2017 was about 7.5 billion and growing at a rate greater than 1% per year. Food production may presently be considered adequate to provide for the entire world population but the area of available arable land capable of direct or indirect human food production is decreasing and climate change is predicted to result in more extreme weather patterns which will likely result in reduced capacity of land capable of food production.

Furthermore, an accelerating global rate of land degradation and desertification, in part, due to normal planet climate cycles but much more significantly due to human caused climate change, poor land management practices and over-exploitation of existing arable land is occurring. This predicament is presently a significant worldwide problem that is continuing unchecked.

SUMMARY

It is a purpose of this present invention to provide vastly improved methods of arable crop production for humans or for feed to animals produced for human consumption on farmland located in the hotter, tropical and semi tropical regions of the Earth. Also, it is a purpose of this invention to provide details of a grass lot-feeding system for cattle wherein the arable sections of land are part of a system that automatically tills, sows, irrigates, grows and harvests such plant crops as Australian Sweet Sorghum for harvesting, chopping and/or optionally pelletizing to be used as cattle feed.

In an embodiment, an irrigation and harvesting system comprises one or more center pivot irrigation assemblies, comprising: a hollow shaft attached to an area of land; one end of a hollow member is attached to the hollow shaft, wherein the hollow member pivots around the hollow shaft, and wherein the hollow member carries irrigation water; a second end of the hollow member is connected to a wheel in contact with the ground, and the wheel is driven at a controlled speed; and a traction device including harvesting equipment is attached to the hollow member.

In an embodiment, the hollow shaft and the hollow member carry electrical cables, conduits or wiring supplied from a wind or solar generator.

In an embodiment, the traction device travels along the hollow member while the hollow member rotates around the hollow shaft.

In an embodiment, the hollow shaft is vertically placed in the ground and the hollow member is attached horizontally from the shaft.

In an embodiment, wherein the traction device includes a proximity switch or a photo-electric cell, or radar or LIDAR or remote control equipment.

In an embodiment, wherein proximity switch or a photo-electric cell is configured to guide the traction along a spiral path.

In an embodiment, a plant growing and harvesting system located on an area of arable ground comprises a traction device including arable ground tilling equipment is attached to a cable providing electricity to drive the traction device located on the area of arable ground; one end of the cable is attached to the traction device, wherein the second end of the cable is attached to a remote electrical power source; wherein the electrical power source is from any source including any renewable source such as from solar or wind energy; and a cable unwinding and rewinding device controlling the length of unwound cable between the traction device and the electrical power source.

In an embodiment, an irrigation and harvesting system located on an area of arable ground comprises a circular section of arable ground divided into concentric areas indicating sub-sections of arable ground within the circular section of arable ground.

In an embodiment, the irrigation and harvesting system comprises a center pivot irrigation assembly located within the center of the circular section of arable ground.

In an embodiment, the center pivot irrigation assembly comprises a hollow shaft attached to an area of land; one end of a hollow member is attached to the hollow shaft, wherein the hollow member pivots around the hollow shaft, and wherein the hollow member carries irrigation water; a second end of the hollow member is connected to a wheel in contact with the ground, and the wheel is driven at a controlled speed; and a traction device including harvesting equipment is attached to the hollow member, wherein the arable land comprises concentric circles.

In an embodiment, a plant growing and harvesting system located on an area of arable ground, comprises an electrically driven traction device including arable ground tilling equipment and a battery pack providing electricity to drive the traction device located on the area of arable ground; a means to exchange a depleted first rechargeable battery pack attached to the traction device for a second fully charged battery pack; wherein the electrical power source used to charge the battery packs is from any source including any renewable source such as from solar or wind energy.

In an embodiment, the harvested crops are pelletized and fed to animals.

In an embodiment, the harvested crops comprise grasses only which are fed to cattle to produce grass fed beef.

In an embodiment, the harvested crops are grasses only which have been cultivated using renewable energy to produce grass fed beef with a zero carbon footprint.

In an embodiment, a method for growing crops, comprises selecting an area of substantially flat land located in a tropical and/or desert region (such as, for example, in Australia or the USA having very low rainfall); providing irrigation water derived from the sea or artesian bore and having been purified by any suitable method such as reverse osmosis membrane to remove substantially all salts and impurities; tilling the land, optionally providing fertilizers and/or potash, and sowing seeds of selected plants, such as Australian Sweet Sorghum, soybeans, or alfalfa; growing and harvesting at least more than one crop per year and up to a fourth crop or part(s) thereof per year, such as 3.5 crops per year; harvesting the suitably matured first crop of plants for animal or human consumption and immediately tilling the selected area of land and sowing a second selected plant; harvesting the suitably matured second crop of plants, optionally tilling the land and sowing a third crop; wherein the first, second, third and/or fourth crops are grown consecutively within a 12 or up to 14 month specified period and rotated during each consecutive specified period according to a sequence so as to best care for the ground while maximizing healthy plant production.

In one embodiment, a method of raising cattle comprises feeding cattle with crops grown by the process of growing crops according to method described herein.

In one embodiment, the cattle is from a cattle breed selected from Angus, Brahman and Brangus.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 shows a diagrammatic plan view of a segment of a typical circular section as defined herein in association with FIGS. 1, 2, and 3.

DETAILED DESCRIPTION

Typically, without irrigation as described herein, an area of arid farmland equal to that shown in FIG. 1 may support a cattle herd of about 500 to 1,000 head whereas the quantity of cattle supportable by the system described herein below may number as many as 12,000 to 20,000 head. It can be seen therefore that the arrangement as described herein is capable of vast increases in productivity while using renewable energy.

As described herein, a range of crops can be produced simultaneously to facilitate continuous production of a fortified animal feed derived from a controlled blend of plant based ingredients with additives such as seaweed (e.g., *Asparagopsis* referenced herein below in quantities of between 1% and 3%) which can be added to the pellets along with minerals, salts and vitamins to provide a fortified grass based feed for cattle produced adjacent to the site of grass lot-fed cattle production.

Reduction of the carbon footprint caused during production of beef as described herein would be such as to virtually eliminate release of the offending emissions by using renewable solar and or wind derived power to drive even the agricultural equipment working the arable ground as well as the seawater purification plant. Furthermore, it is proposed that the normal methane production by ruminating animals such as cattle, which is regarded as a powerful "greenhouse gas" (burps—90% and farts—10%) which is generated during the digesting process of grass and feed consumed by ruminating cattle can be substantially reduced. This can be achieved by feeding small quantities (1% to 3% of total food consumed by the cattle) of selected seaweed, such as *Asparagopsis* which according to the CSIRO (Commonwealth Scientific and Industrial Research Organization) can reduce methane emissions by as much as 99%.

It is also proposed to optionally feed selected probiotics suitable for cattle which can be provided either in the solid animal feed or drinking water consumed by the cattle.

By selectively combining the use of new and improved technologies according to the disclosures herein provided, it is expected that the quantities of food harvested, particularly from currently arid regions of the world, will be vastly increased.

Among other sources, electrical power derived from solar and wind energy will be used to drive large scale seawater purification plants, such as by the method commonly known as "reverse osmosis" and pump the purified water for irrigation use on selected arable land in, for example, arid regions, such as Nevada, Arizona, New Mexico, California and Texas in the USA, when suitably located within about 600 miles from the coasts or other suitable arid and semi desert regions of the Australian "outback". including Northern Territory, Queensland, Western Australia, New South Wales South Australia, and Victoria may be selected.

Figure 1:
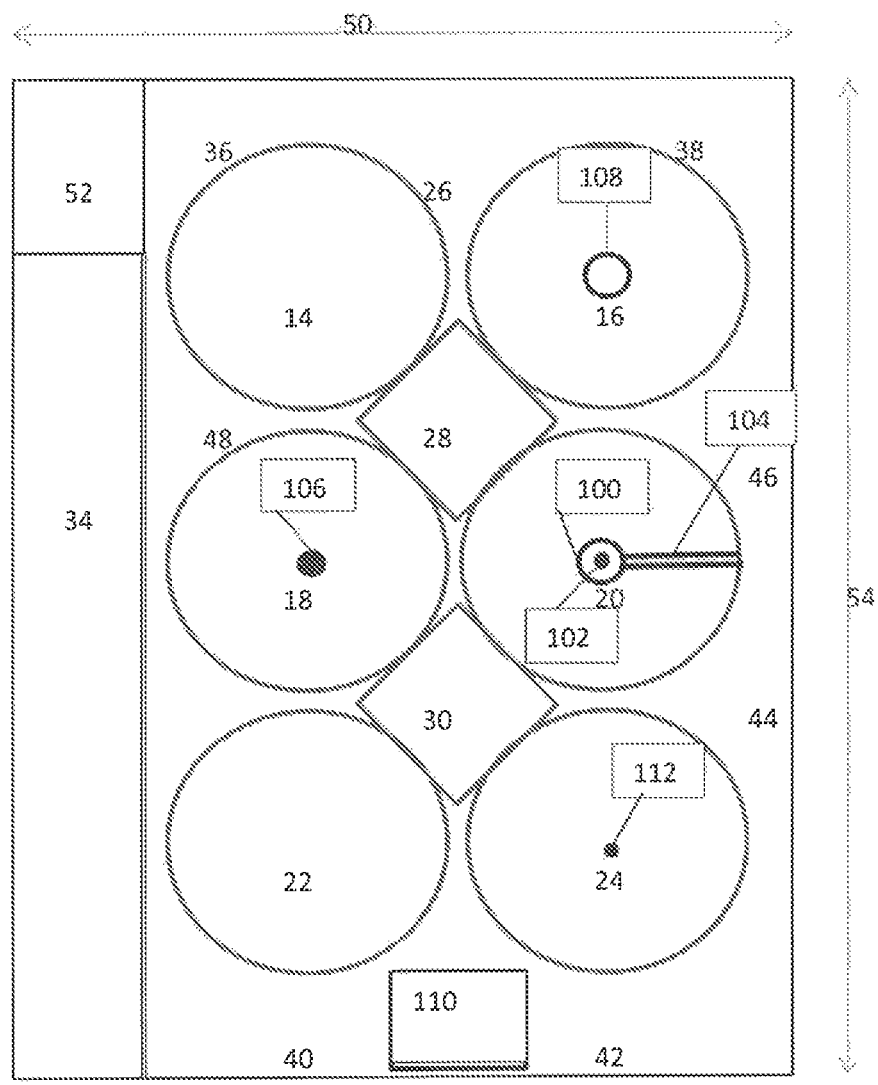
FIG. 1 is a diagrammatical illustration of an area of subdivided land for an automated facility for intensive large-scale production of grass fed cattle with reduced or eliminated carbon footprint.

FIG. 1 shows a plan view of a suitable area of suitably arid land, which may be located in Australia, having low annual rainfall but otherwise capable of supporting crop production. It is expected that more than one crop and as many as 3 crops or more can be grown during a typical year when adequate water is made available to the plants of each crop.

As can be seen in FIG. 1, a diagrammatically represented plan view of a rectangular portion of arable land is shown having a width indicated by double ended arrow 50 and a length indicated by double ended arrow 54.

The outer edges of the section of land 50 by 54 shown in FIG. 1 may enclose an area equal to, for example, about 12 square miles or about 7,680 acres with plan view dimensions of 3 miles wide (50) by 4 miles long (54).

The view in FIG. 1 of the land area includes a series of circles which may vary in number but in the example shown six are marked 14, 16, 18, 20, 22 and 24 as well as other sections of the land area such as rectangular sections 28 and 30. Additionally, rectangular areas 52 and 34 are shown with sections between the circular and rectangular sections including 36, 38, 48, 46, 44, 40 and 42 also indicated.

The details of the circular areas are described in more detail in association with FIG. 2 herein below.

The entire enclosed area of land is arranged with separated sections wherein:

Circular sections marked 14, 16, 18, 20, 22 and 24 are arranged to grow irrigated crops for food;

Sections 36, 38, 48, 46, 44, 40 and 42 are arranged with solar panels (or wind turbines) for the purpose of collecting electrical power derived from the sun and/or prevailing wind as well as electric battery storage equipment such as lithium ion. In this way electricity can be generated by solar panels or wind turbines and stored for convenient use at night, for example, to drive the traction and agricultural equipment shown as 64 in FIG. 2.

Rectangular area 52 is conveniently located adjacent to the main cattle feed lot pen 34, to provide a location for installation of the crop processing equipment such as chopping and cattle feed pelletizing machinery;

Rectangular area 34, which may be divided into smaller subsection cattle pens and passageways to control cattle movement comprises the main cattle feed lot pen adjacent to the cattle feed processing area 52;

Optionally a conveyor or static cattle feed trough is indicated by a double line along the full length of the cattle pen 34;

The circular area of arable ground in each of the circles as shown may be about 780 acres (1.25 mile diameter). Therefore the circular sections 14, 16, 18, 20, 22 and 24, in this example, comprise a total of approximately 4,800 acres which is about 62% of the entire 12 square mile area (7,680 acres) shown in FIG. 1.

The cattle pen shown in FIG. 1 as 34 may be divided into a series of smaller pens connected with gated passageways so as to allow selected cattle to be transferred under control from one smaller pen to another. Each pen can be provided with cattle feeding troughs such that specifically formulated animal feed according to a selected diet can be provided for feeding to selected cattle. Furthermore scales can be located in the connecting passageways in such a way that the individual animals can be weighed when transferred between pens.

Referring again to the circular sections 14, 16, 18, 20, 22 and 24, in this example a centrally located circular section 100 or 102, as shown in FIG. 1, of perhaps 20 acres or less or more can be arrange in one or more of the circular sections 14, 16, 18, 20, 22 and 24. The purpose of these centrally located circles 100 or 102 can be to accommodate storage of irrigation water tanks with irrigation water temporarily stored therein, selected fertilizers (liquid or solid), mixing equipment to mix fertilizers with the irrigation water prior to use, solar panels and any other items required to service the arable ground in the respective circular sections 14, 16, 18, 20, 22 and 24. At the center of each circle, a renewable electricity generating wind turbine such as 102 or 112 may be provided. The power generated by the wind turbine or solar panels located adjacent to the circles, can be used to recharge electric battery power packs which are provided for use by traction unit 64 and that can be exchanged, after recharging, with interchangeable, "empty" electric battery power packs carried and used for the energy source on each traction device 64 (a more detailed description is provided below). Alternatively a tower 106 of about 75 feet in height or less or more may be provided. Additionally a path or roadway 104 may be provided to allow convenient access for vehicles and equipment such as traction device 64 and agricultural equipment (and exchangeable electric battery power packs as described below) of any kind attached thereto. The roadway 104 is most preferably a straight section of road taking the shortest distance between the central area such as 100 and 108 and the perimeter of each respective circular section 14, 16, 18, 20, 22 and 24. Additionally, an area 110 is provided for convenient storage of all agricultural items of equipment such as traction devices 64, harvesting or rototilling equipment when not in use and also an adequate quantity of electric battery power pack recharging stations as described below.

In another embodiment production of hydrogen gas (H2) from electrolysis of water using renewable power in the form of solar or wind derived electricity is an alternative to battery packs. Hydrogen gas can be thusly generated, compressed and stored in suitable vessels. The vessels can then be transferred to the above described traction equipment or vehicles of any kind such as trucks and used to generate electricity via a hydrogen fuel cell or to be used in internal combustion engines adapted for use of hydrogen as a fuel.

In another embodiment all or selected cattle may be fitted with RFID Ear Tags so as to provide an electronic method of identifying each individual animal. In this way an animal can be identified and weighed in such a way as to enable the animal weight to be conveniently recorded centrally in an accessible computer data bank. Accordingly, when the animals are weighed periodically the rate of growth of the individual animals can be determined and, if desired, a change in diet can be provided to alter a growth rate.

Any number of circular sections 14, 16, 18, 20, 22 and 24 of any suitable dimensions may be arranged on any section of land as may be required.

Figure 2:
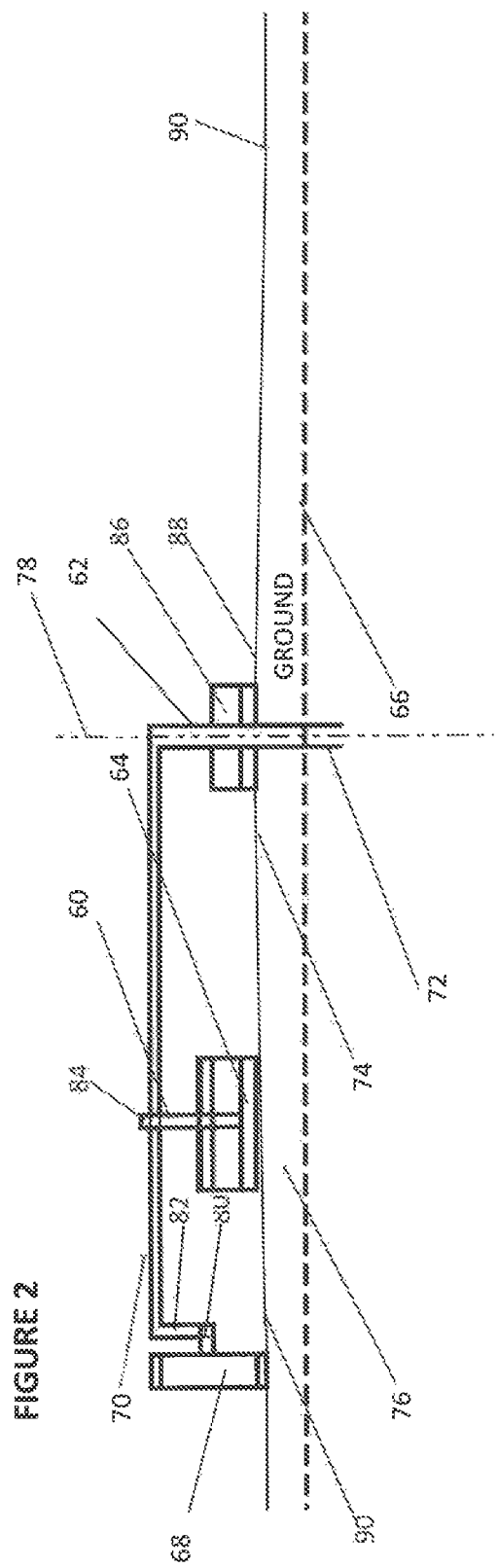
FIG. 2 is a diagrammatical illustration of an elevation view of one of the automated production circles of FIG. 1.

The primary purpose of the arrangement described in association with FIG. 1 and FIG. 2 is to enable the most efficient production of food in the form of beef harvested from cattle for human consumption while using renewable electrical energy to power electric motors, as opposed to fossil fuel use, integrated with the cattle feed production and processing equipment and to ultimately achieve beef harvested from cattle having been produced with a Zero Carbon Footprint.

Each of the circular sections marked 14, 16, 18, 20, 22 and 24 can be arranged with "center pivot irrigation" capable of delivering purified seawater (or freshwater), with or without fertilizers blended therewith, in measured and metered quantities as needed to enable maximized growth of the plant crops which have been sown in the circular sections such as 14, 16, 18, 20, 22 and 24.

Extract from Wikipedia: "Center-pivot irrigation (sometimes called central pivot irrigation), also called waterwheel and circle irrigation, is a method of crop irrigation in which equipment rotates around a pivot and crops are watered with sprinklers. A circular area centered on the pivot is irrigated, often creating a circular pattern in crops when viewed from above (sometimes referred to as crop circles)."

Referring now to FIG. 2 a cross section through a side elevation of a circular section of arable land such as any of the circular sections 14, 16, 18, 20, 22 and 24 as shown in FIG. 1, is shown.

The section of ground 76 can be flat or partially "cone" shaped such that the center of the circle, at center line 78, is higher than at the outer edges 90. If the circular section of ground is to be cone shaped, the surfaces 74 and 88 will slope downwardly from the center toward the outer edges thereby enabling excess rainwater to drain away from the center.

A hollow vertical shaft 62 with centerline 78 is located in a rigidly vertical position but is mounted in bearings that allow it rotate freely, at the center of the circle 14. Shaft 62 is hollow so as to optionally allow a safe location for conduits, cables and pipes therein to provide electrical power as needed to power equipment such as 64 and drive the wheel 68 at controlled speed. Alternatively such cables and pipes can be conveniently attached to the outside of horizontal shaft 62.

A hollow, horizontal member 70 is shown bridging between the centrally located shaft 62 and vertical member 82. Member 70 may be arranged in an arch between the center 78 and outer member 82. Additionally supporting assemblies with wheels (not shown) may be located along the full length of member 70 but in such a way as to allow member 84 to freely travel adjacent to member 70 along its full length.

The enclosed hollow members 62 and 70 are joined so as to allow cables, conduits and wiring provided therein to carry irrigation water to the surface of the ground in the circle 14 or other circles, and also to allow transfer of solar or wind generated electrical power to drive the electric motors mounted in the traction and agricultural equipment assembly 64.

An electrically driven wheel 68 is conveniently mounted to member 82 and driven at adjustable speed such that the wheel travels along a pathway adjacent to the perimeter 90 of the circle 14. As the wheel 68 rotates around the circle 14, it carries the horizontal member 70 around the full circle carrying with it proximity locating devices attached to member 84. In this way, the member 84 can be guided along a spiraling path which spirals as required between the circle 14 perimeter 90 and the innermost region of the circle 14 around the center pivot adjacent to foundation 86.

Member 60 connects member 84 to implement 64. Implement 64 may comprise any suitable farm implement such as rototiller or rotavator.

Member 64 represents an assembly comprising a traction device similar to the typical John Deere tractor but with the diesel engine replaced with electric drive motors which can be powered by any renewable electric energy source such as solar or wind power derived electricity.

The traction device is preferably a tractor fitted with rubber "tracks" as opposed to circular drive wheels.

The traction device 64 which can include a suitably sized electricity storage battery or grouping of batteries is assembled together with any selected agricultural implement including harvesting equipment of any type adapted to use electricity as the required source of power. The electricity storage battery attached to each traction device 64 is most preferably capable of storing sufficient electricity to power the traction device 64 for a period of a two or more or less hours and most importantly to enable the traction device 64 to travel from any of the circular sections 14, 16, 18, 20, 22 and 24, after disconnecting from its electric cable, to either another circular section such as 14, 16, 18, 20, 22 and 24, where it would reconnect to the electrical cable associated with the new circular section or to area 110 where it may remain stored for any period or to exchange or collect a different item of agricultural equipment, for example, the traction device 64 may have a rototilling device attached which is exchanged for a harvesting implement. Alternatively, items of agricultural equipment may be rigidly and permanently attached to a traction device such as 64 such that when a change from rototilling or seed sowing (drilling) to harvesting is required, the entire traction and rototilling device may disconnect from the cable associated with the particular circular section 14, 16, 18, 20, 22 and 24 in which the traction device has been working and travel under its own battery stored electric power and travel to storage area 110 and then, for example, an entirely separate traction and harvesting device may be directed to travel from the area 110 to any circular section 14, 16, 18, 20, 22 and 24 where the traction and harvesting device would connect to the electric cable associated with the new circular section site and commence operation. In this way a single traction device 64 can be utilized to provide the traction required by any and all agricultural implements for operation on any and all circular sections such as 14, 16, 18, 20, 22 and 24.

In another embodiment, the electrical cable connecting the traction device 64 to the renewable electrical power source can be positioned around a wheel that is tethered via a central shaft to the uppermost point on tower 106 such that the cable is connected to the traction device at one end and to the uppermost section of the tower close to the opposite end of the cable with the end connected to the renewable power supply. The uppermost section of the tower can be arranged in such a way that it can freely rotate about a centrally disposed, vertical axis. The cable can be suitably tensioned between the upper section of tower 106 and a mast that is located on the traction device 64. A cable tensioning, rewinding and unwinding device can be located at any suitable location along the length of the cable but most preferably at the base of the tower 106. In this way, the cable is connected to the mast of traction device 64 at one end and the rewinding device at the base of the tower and through the rotating wheel at the uppermost section of the tower. Furthermore, as the traction device follows the spiraling pathway either moving toward the central tower 106 or away from tower 106 the cable is suspended above ground under suitable tension. As the traction device follows its spiraling path moving around the central tower 106 the uppermost section can rotate such that the cable and wheel through which the cable transfers is always perpendicular to the traction device 64.

The traction and agricultural implement assembly is remotely computer or PLC controlled according to selected programs written specifically for the purpose.

The traction device 64 can also include leveling blades to ensure a continuous surface across the complete circle of ground 14, such that no ridges are present.

The normal procedure after harvesting of the earlier crop will be to plough or rototill the ground which has been harvested with the remotely controlled traction and implement assembly followed by sowing of the selected seed to grow a desired crop such as Sorghum, Lucerne, alfalfa, clover, corn, maize, any grain or selected grass for use as food for either human or animal consumption. Preferably crops will be rotated according to crop rotation plan. Crop rotation is a procedure used by farmers to maximize crop yield while also adding nutrients such as nitrogen to the soil medium for the benefit of crops grown subsequently, which, for example, with certain strains of clover is provided by way of root "nodules" which grow naturally in the root system of such plants and contain nitrogen which becomes food for plants grown in subsequent crops. Accordingly it can be helpful if the crop rotation comprises planting and harvesting, for example, a first grain crop such as sorghum followed by planting a desirable second crop such as Lucerne, alfalfa or clover. A dissimilar third crop in the crop rotation plan may be a "root" crop or another grain crop such as sorghum.

"Crop rotation" (as defined by Wikipedia). Crop rotation is the practice of growing a series of dissimilar or different types of crops in the same area in sequenced seasons. It can help in reducing soil erosion and increasing soil fertility as well as improving crop yield."

The traction and agricultural implement assembly 64 is guided along a spiral path by means of a proximity switch arrangement, or photo-electric cell able to recognize the edge of the previously rototilled or otherwise processed ground, which is located in the horizontal member 70 adjacent to the member 84 which tracks the proximity switch. The proximity assembly is arranged to steer the tracked traction device along its spiraling path so as to facilitate the complete processing, ploughing, rototilling of the entire surface of the circular are of ground such as 14.

In yet another embodiment, the traction and agricultural implement assembly 64 may comprise a first mast conveniently mounted to it in a vertical disposition such that the upper end of the first mast may be at least 30 feet above ground level. An end of a tensioned electricity transmitting cable may be attached to traction and agricultural implement assembly 64 to provide power to all of the electric motors associated with assembly 64. The cable may pass through a swiveling loop fixed to the upper end of the mast such that the cable can be held well above ground level. A second end of the cable may be attached to a fixed location electric power supply located at or near the center of the circle 14. The cable may have a cable tensioning and cable winding or coiling device mounted close to the center of the circle. The cable tensioning and winding or coiling device may be arranged so as to apply controlled tension to the cable while allowing the cable to extend if assembly 64 moves away from the circle 14 center and alternatively retract the cable if the assembly 64 moves closer to the center of circle 14. In this way the tensioned cable can be arranged to provide electricity to the electric drive motors associated with traction and agricultural implement assembly 64 while the tension is adequate to ensure the cable does not contact the ground anywhere along its complete length between the center of circle 14 and the traction and agricultural implement assembly 64. Accordingly adequate electric power can be safely provided to enable normal operation of the traction and agricultural implement assembly 64.

In yet another embodiment a device similar to traction and agricultural implement assembly 64 which is connected to a tensioned cable and a cable tensioning and winding or coiling device as described herein may be arranged so that traction and agricultural implement assembly 64 can work arable ground in a rectangular pattern wherein the traction and agricultural implement assembly 64 travels in a first straight line for a distance such as up to a mile or more and then after turning through a 180 degree movement returning along a second straight line path located immediately adjacent to and parallel with the ground previously tilled in the first straight line path. The operation of the traction and agricultural implement assembly 64 along the first and second straight lines can be repeated so as to till or otherwise treat a rectangular area of arable ground. In this way a source of renewable electricity derived from solar or wind energy can be used to operate traction and agricultural implement assemblies as may normally be required in the tilling, sowing and harvesting of any suitable crop.

In another embodiment the traction and agricultural implement assembly 64 may be controlled by a human operator located on and travelling with the traction device or alternatively a Robot could control the traction and agricultural implement assembly 64.

In another embodiment the traction and agricultural implement assembly 64 may be controlled by a satellite based Global Positioning System (GPS).

In yet another embodiment the traction and agricultural implement assembly 64 may be controlled by LIDAR or any combination of the controlling methods proposed herein.

A series of conveyors can be arranged to carry harvested crops from the point of harvesting by the traction and harvesting implement assembly 64 to section 52 as shown in FIG. 1. A first conveyor (not shown) is conveniently mounted adjacent to and parallel with the horizontal member 70 in such a way that it can transfer crops immediately following harvesting from the growing section of the circular space 14 to the section marked 52.

The conveyor system can be arranged so that it can also carry any selected dry, organic or inorganic fertilizers (a fertilizer as described by Wikipedia is: any material of natural or synthetic origin that is applied to soils or to plant tissues to supply one or more plant nutrients essential to the growth of plants.) such as, nitrogen fertilizer, phosphate fertilizer or potash fertilizer from a conveniently located central point such as in area marked 52, and onto the surface of the circles such as 14 so as to fertilize the ground across the entire area of the arable ground as may be required.

All cattle raised in the manner described herein and in association with FIG. 1 and FIG. 2 can be fitted with RFID implants or RFID tags such as USDA recommended tags such that each animal can be recognized as an individual and its individual growth rate monitored with weight gain and other relevant information. Drones, arranged to fly immediately above the animals in the pens may be used to collect and transfer the data to a central computer recording device located conveniently wherein each animal can have a separate file in which any details about the birth, parents, age, medication provided, diet or any information about the specific animal can be retained in memory.

The irrigation of arid ground as described herein will enable more than a single crop to be grown and harvested per year. For example, sorghum with a growth phase from planting t harvesting of about 100 days or less would facilitate growing and harvesting up to 3 or more crops per year.

According to a variety of websites on the internet, "Sorghum is a genus of flowering plants in the grass family Poaceae. Seventeen of the twenty-five species are native to Australia, with the range of some extending to Africa, Asia, Mesoamerica, and certain islands in the Indian and Pacific Oceans."

Figure 3:
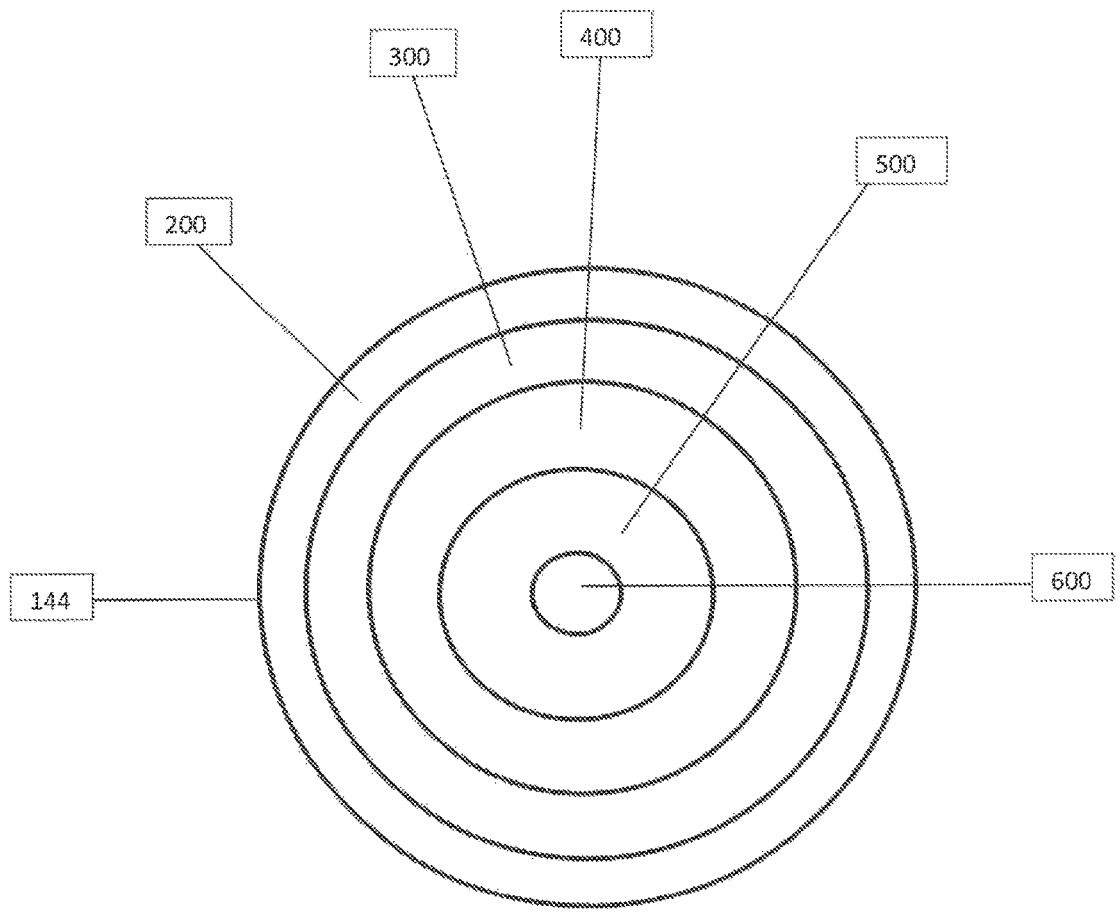
FIG. 3 shows a plan view of a circular section of arable ground divided into concentric areas indicating sub-sections of arable ground within the circular section of arable ground.

Referring now to FIG. 3 a plan view of a circular section of arable ground such as the circular sections 14, 16, 18, 20, 22 and 24 of FIG. 1 is shown divided into concentric areas indicating sub-sections 200, 300, 400 and 500 of arable ground within the circular section of arable ground. Area 600 represents a storage area for irrigation water, fertilizers (solid and/or liquid) and other equipment as described earlier herein located at the center of the entire circular section 144. Circular section 144 shown in FIG. 3 can be similar to each of the six circular sections 14, 16, 18, 20, 22 and 24, shown in FIG. 1. The number of six area's 14, 16, 18, 20, 22 and 24, exemplified in FIG. 1 may be increased or decreased to any selected number of circular areas.

The total area of each sub-section 200, 300, 400 and 500 may be about 200 acres each in this instance. The total area of sub-section 144, similar to all circular sections 14, 16, 18, 20, 22 and 24 may be about 800 acres each or less or more, in this instance.

Referring to FIG. 1 again it should be understood that the total area shown by double headed arrows 50 and 54 equals, in this instance, about 7,680 acres and the area of ground is most preferably located in a sub-tropical or tropical, semi-arid/semi-desert region of, for example, the state of Queensland in Australia and most preferably a region of relatively low rainfall with prevailing weather of mostly hot sunny days all year round. Accordingly, given that an adequate quantity of irrigation water with plant and crop nutrients and fertilizer, is available to the crops grown in the circular sections 14, 16, 18, 20, 22 and 24 and reasonably assuming each crop growing cycle is between 90 days and 120 days, 3 crops per year can be grown and harvested. Most preferably the planting of each crop is provided according to a sequence which takes account of prevailing season weather conditions of temperatures and sunshine hours per day, which will vary during the course of a normal year. More specifically each circular section is most preferably planted or sown according to a series of consecutive plantings and correspondingly, after the completion of each growing period for each circular section, the crop is harvested between 90 and 120 days after the crop has been sown. Accordingly, the harvesting of each circular section (such as 14, 16, 18, 20 and 22) is regarded as one "harvest". Therefore, the total quantity of "harvests" would be equal to the 6 circular sections 14, 16, 18, 20, 22 and 24 times 3 (the number of crops per year) which equals 18 "harvests", i.e., 6 circular sections×3 crops per year totals 18 separate harvests per year. The fully grown crops are then harvested consecutively at an annual rate of 1 "harvest" per 365 days divided by 18 which equals one "harvest" every 20 to 21 days. In this way, the maximum number of cattle can be raised at any given time when the amount of food harvested in each "harvest" is sufficient to provide feed for the number of cattle raised at any given time. Furthermore, if each circular section such as 14, 16, 18, 20, 22 and 24 as shown in FIG. 1, is divided into 4 separate areas of approximately 200 acres each this would represent a total potential quantity of 72 "harvests" per year according to the above methodology. This would represent a sequencing of 72 consecutive "harvests" of about one 200 acre "harvest" every 5 day period. In this way the same number of cattle would be accommodate however the semi-continuous flow of feed harvested from each crop could be more suitably consistent and the period of time between harvesting and consumption of the harvested crop (which can then be immediately processed and pelletized) by the cattle could be reduced—providing potentially fresher feed to the cattle.

It should be noted that a 7,680 acre area of semi-desert farm land as proposed above with normal rainfall can support not more than about 500 cattle whereas when a suitable 7,680 acre area is irrigated and suitably fertilized as described herein above a herd of approximately 10,000 or more cattle could be adequately fed and raised on the same 7,680 acre area of ground.

Referring now to FIG. 4 a diagrammatic plan view of a segment of a circular section such as 14, 16, 18, 20, 22 and 24 of FIG. 1 is shown. The view in FIG. 4 is from directly above and of a segment showing a first arc 700, which represents a segment of inner circle 100 and a second arc 710, which represents a segment of the outer circular perimeter of circular section 20 shown in FIG. 1. A pathway 736, shown as 104 in FIG. 1, is defined by dotted lines 708 and 712 in FIG. 4 wherein the pathway travels in a direct straight line, parallel to a centerline 726 that passes through the center point of circular section 20 and intersecting first and second arcs 700 and 712 respectively. A double headed arrow 730 indicates the direction of travel of battery packs either travelling from the charging station 702 to the traction device 641 or from the traction device 641 to the battery charging station 702. A pathway 736 centerline 726 is shown and this centerline 726 intersects with the center point of the circular section 20 shown in FIG. 1. The length of the distance indicated by double headed arrow 730 in an actual circular section such as 20 may be as much as 1,500 meters or less or more. An area shown as a rectangular section 702 of FIG. 4 is shown within the inner circle 100 of circular section 20 in FIG. 1 and defined by arc 700 in FIG. 4. Arrows 720 and 722 show a direction in which the traction device 641 can travel along a spiraling pathway centered on the central pivot point of circular section 20 and gradually gets closer to either first arc 700 or second arc 710 depending upon the direction of the spiral pathway. Traction device 641 in FIG. 4 is similar to traction device 64 shown in FIG. 2 and is arranged to rototill, plough, sow crops or harvest crops in the "disc" like area of ground between the full circle of which first arc 700 is a segment and the circle perimeter indicated by second arc segments 710. The traction device 641 can be powered by any means such as by a suitable diesel combustion engine however most preferably the diesel engine on traction device 641 has been exchanged with electric motor(s) which is/are driven by solar or wind or other renewable energy source converted in to stored electricity. The electrical energy can be stored in battery packs such as 706, 718 and 716. The rectangular section 702 defines a battery charging station where first battery pack 706, having been used by traction device 641 to a point where most usable stored electrical energy therein has been consumed in use as the driving energy source of traction device 641. As represented in the plan view of FIG. 4 depleted first battery pack 706 has been removed from traction device 641 along portable tracks 732 and 734 in the direction shown by arrow 724 and onto a powered cart (not shown). The powered cart then travels to the rectangular section 702 battery charging station, thereby carrying with it the energy depleted first battery pack 706. Battery 706 is lifted over any other items that may be located on the pathway 736

In another embodiment the traction device 641 can be used to cultivate, plant and/or harvest an area of ground that may have any plan view profile, for example, the area of ground may be rectangular, square or of any other shape or profile. Traction device 641 has measuring equipment capable of determining the amount of electrical power remaining in any battery pack loaded thereon and connected to the electric drive motors of the traction device 641. Accordingly the traction device can determine the distance and amount of work it can perform until the battery pack such as 706, is depleted and can determine when it is necessary to exchange the depleted battery pack for a fully charged battery pack.

A conduit or cable is located parallel with and along the pathway under the surface of the pathway, which can be detected by suitable detecting equipment mounted to the traction device enabling the traction device to follow the pathway 736 and to other circular sections such as 14, 16, 18, 22 and 24 shown in FIG. 1 or to the implement changeover station 110 in FIG. 1.

The traction device 641 as shown in FIG. 4 can be arranged to have a human or robot driver as well as remote controlling apparatus to enable continuous 24 hour per day operation of the traction device 641 and any implements attached thereto By employing the methods disclosed above to firstly cultivate grass crops, then combining the harvested grass with a seaweed such as *Asparagopsis*, then feeding the mixture to cattle wherein only renewable energy such as electricity derived from wind or solar panels has been used, grass fed beef having a "zero carbon footprint" can be harvested.

Embodiments include, but are not limited to the following.

In an embodiment, an irrigation and harvesting system comprises one or more center pivot irrigation assemblies, comprising: a hollow shaft attached to an area of land; one end of a hollow member is attached to the hollow shaft, wherein the hollow member pivots around the hollow shaft, and wherein the hollow member carries irrigation water; a second end of the hollow member is connected to a wheel in contact with the ground, and the wheel is driven at a controlled speed; and a traction device including harvesting equipment is attached to the hollow member.

In an embodiment, the hollow shaft and the hollow member carry electrical cables, conduits or wiring supplied from a wind or solar generator.

In an embodiment, the traction device travels along the hollow member while the hollow member rotates around the hollow shaft.

In an embodiment, the hollow shaft is vertically placed in the ground and the hollow member is attached horizontally from the shaft.

In an embodiment, wherein the traction device includes a proximity switch or a photo-electric cell, or radar or LIDAR or remote control equipment.

In an embodiment, wherein proximity switch or a photo-electric cell is configured to guide the traction along a spiral path.

In an embodiment, a plant growing and harvesting system located on an area of arable ground comprises a traction device including arable ground tilling equipment is attached to a cable providing electricity to drive the traction device located on the area of arable ground; one end of the cable is attached to the traction device, wherein the second end of the cable is attached to a remote electrical power source; wherein the electrical power source is from any source including any renewable source such as from solar or wind energy; and a cable unwinding and rewinding device controlling the length of unwound cable between the traction device and the electrical power source.

In an embodiment, an irrigation and harvesting system located on an area of arable ground comprises a circular section of arable ground divided into concentric areas indicating sub-sections of arable ground within the circular section of arable ground.

In an embodiment, the irrigation and harvesting system comprises a center pivot irrigation assembly located within the center of the circular section of arable ground.

In an embodiment, the center pivot irrigation assembly comprises a hollow shaft attached to an area of land; one end of a hollow member is attached to the hollow shaft, wherein the hollow member pivots around the hollow shaft, and wherein the hollow member carries irrigation water; a second end of the hollow member is connected to a wheel in contact with the ground, and the wheel is driven at a controlled speed; and a traction device including harvesting equipment is attached to the hollow member, wherein the arable land comprises concentric circles.

In an embodiment, a plant growing and harvesting system located on an area of arable ground, comprises an electrically driven traction device including arable ground tilling equipment and a battery pack providing electricity to drive the traction device located on the area of arable ground; a means to exchange a depleted first rechargeable battery pack attached to the traction device for a second fully charged battery pack; wherein the electrical power source used to charge the battery packs is from any source including any renewable source such as from solar or wind energy.

In an embodiment, the harvested crops are pelletized and fed to animals.

In an embodiment, the harvested crops comprise grasses only which are fed to cattle to produce grass fed beef.

In an embodiment, the harvested crops are grasses only which have been cultivated using renewable energy to produce grass fed beef with a zero carbon footprint.

In an embodiment, a method for growing crops, comprises selecting an area of substantially flat land located in a tropical and/or desert region (such as, for example, in Australia or the USA having very low rainfall); providing irrigation water derived from the sea or artesian bore and having been purified by any suitable method such as reverse osmosis membrane to remove substantially all salts and impurities; tilling the land, optionally providing fertilizers and/or potash, and sowing seeds of selected plants, such as Australian Sweet Sorghum, soybeans, or alfalfa; growing and harvesting at least more than one crop per year and up to a fourth crop or part(s) thereof per year, such as 3.5 crops per year; harvesting the suitably matured first crop of plants for animal or human consumption and immediately tilling the selected area of land and sowing a second selected plant; harvesting the suitably matured second crop of plants, optionally tilling the land and sowing a third crop; wherein the first, second, third and/or fourth crops are grown consecutively within a 12 or up to 14 month specified period and rotated during each consecutive specified period according to a sequence so as to best care for the ground while maximizing healthy plant production.

In one embodiment, a method of raising cattle comprises feeding cattle with crops grown by the process of growing crops according to method described herein.

In one embodiment, the cattle is from a cattle breed selected from Angus, Brahman and Brangus.

While illustrative embodiments have been illustrated and described, it will be appreciated that various changes can be made therein without departing from the spirit and scope of the invention.

The embodiments of the invention in which an exclusive property or privilege is claimed are defined as follows:

1. An irrigation and harvesting system, comprising:
   one or more center pivot irrigation assemblies, comprising:
   a hollow shaft attached to an area of land;
   one end of a hollow member is attached to the hollow shaft, wherein the hollow member pivots around the hollow shaft, and wherein the hollow member carries irrigation water;
   a second end of the hollow member is connected to a wheel in contact with the ground, and the wheel is driven at a controlled speed; and
   a traction device including harvesting equipment is attached to the hollow member, wherein the traction device travels along the hollow member while the hollow member rotates around the hollow shaft.

2. The irrigation and harvesting system of claim 1, wherein the hollow shaft and the hollow member carry electrical cables, conduits or wiring supplied from a wind or solar generator.

3. The irrigation and harvesting system of claim 1, wherein the hollow shaft is vertically placed in the ground and the hollow member is attached horizontally from the shaft.

4. The irrigation and harvesting system of claim 1, wherein the traction device includes a proximity switch or a photo-electric cell, or radar or LIDAR or remote control equipment.

5. The irrigation and harvesting system of claim 4, wherein the proximity switch or the photo-electric cell is configured to guide the traction device along a spiral path.

* * * * *